Aug. 2, 1932.  C. MORROW  1,869,859
DRIVING MECHANISM
Filed March 29, 1930  3 Sheets-Sheet 1
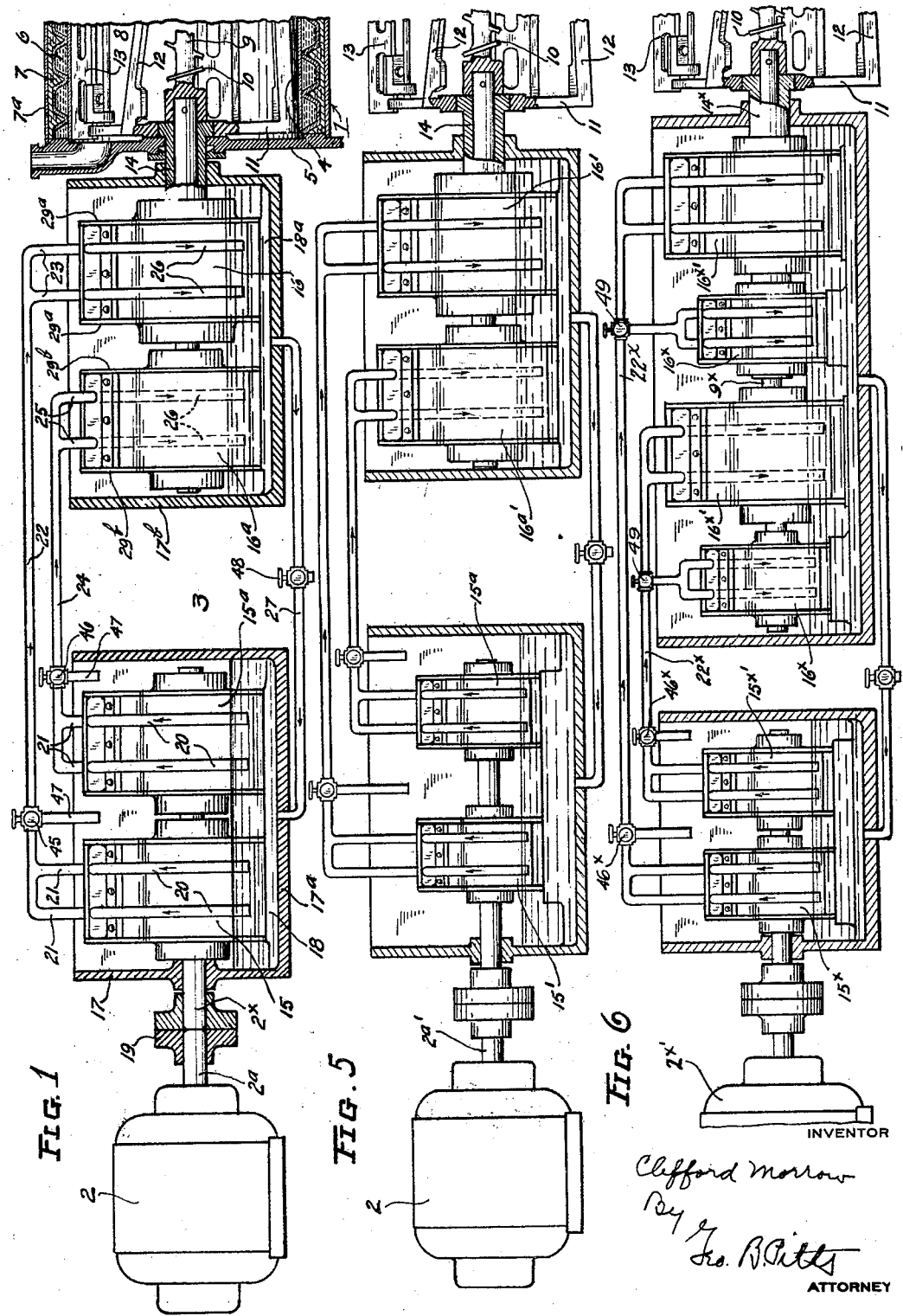
INVENTOR
Clifford Morrow
By Geo. B. Pitts
ATTORNEY Aug. 2, 1932.  C. MORROW  1,869,859
DRIVING MECHANISM
Filed March 29, 1930  3 Sheets-Sheet 2
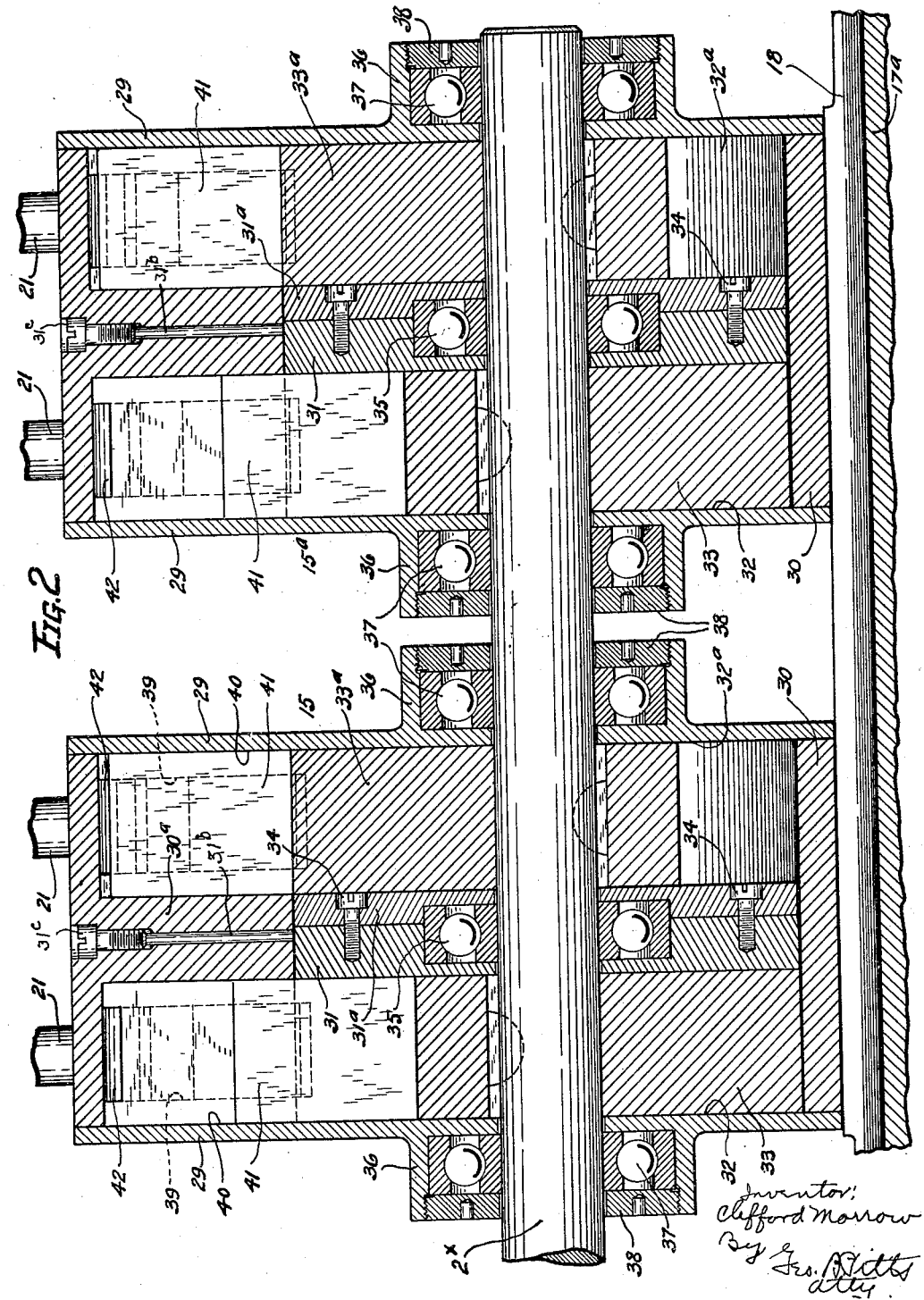

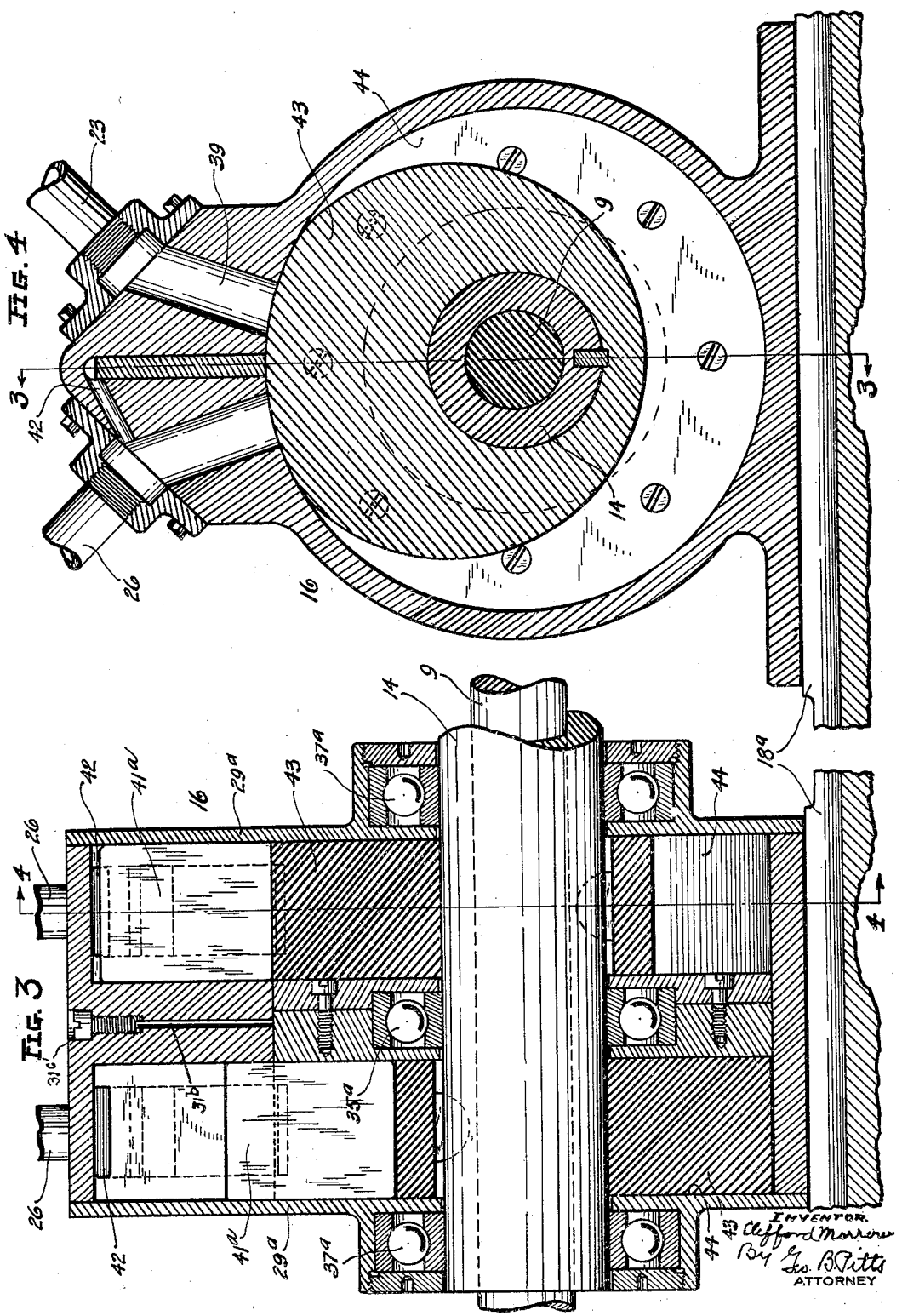

Patented Aug. 2, 1932

1,869,859

UNITED STATES PATENT OFFICE

CLIFFORD MORROW, OF CANTON, OHIO, ASSIGNOR TO THE H. H. MILLER INDUSTRIES COMPANY, OF CANTON, OHIO, A CORPORATION OF OHIO

DRIVING MECHANISM

Application filed March 29, 1930. Serial No. 439,990.

This invention relates to a driving mechanism.

One object of the invention is to provide an improved driving mechanism for one or more shafts, more particularly for shafts disposed concentrically and operable in opposite directions.

Another object of the invention is to provide, in a freezing apparatus for making ice cream, ices and the like, an improved driving mechanism for its agitating mechanism, capable of readily effecting starting thereof at any and all times, to the end that strains on the freezing cylinder wall, the agitating mechanism and the scrapers are eliminated.

Another object of the invention is to provide, in a freezing apparatus for making ice cream, ices and the like, an improved driving mechanism in which the rotating members of the agitating mechanism may be driven at different speeds, the speed of either member readily varied or either member stopped independently of the other member.

Another object of the invention is to provide, in a freezing apparatus for making ice cream, ices and the like, an improved driving mechanism that is relatively simple, durable and readily controlled.

A further object of the invention is to provide a freezing apparatus having an improved driving mechanism, comprising a primary motor and a secondary motor driven thereby and connected to the agitating mechanism of the freezing apparatus, whereby the primary motor may be driven at constant speed and the secondary motor controlled to drive the agitating mechanism at varying speeds.

Other objects of the invention will be apparent to those skilled in the art to which my invention relates from the following description taken in connection with the accompanying drawings, wherein Fig. 1 is a view partly in side elevation and partly in section of a driving mechanism and freezing apparatus embodying my invention, a portion only of the freezer being shown.

Fig. 2 is a fragmentary longitudinal section through the power generating units.

Fig. 3 is a longitudinal section on the line 3—3 of Fig. 4 through one of the driving units.

Fig. 4 is a section on the line 4—4 of Fig. 3.

Figs. 5 and 6 are views similar to Fig. 1, but showing other embodiments of my invention.

Referring to the drawings, 1 indicates as an entirety a freezer, 2 indicates as an entirety a primary motor and 3 indicates as an entirety a secondary motor. The freezer 1 and motors 2, 3, are mounted on a suitable support or base (not shown) of any desired construction.

The freezer 1 is preferably constructed substantially similar to the freezer shown and described in Letters Patent No. 945,570 granted to J. C. Miller. In such chosen example, the freezer comprises an inner cylinder 4 having a front head (not shown) and a rear head 5 forming a chamber in which the freezing operation is effected, a brine circulating passage 6, an insulating jacket 7, an outer cylinder 7a and an agitating mechanism 8 consisting of inner and outer, oppositely rotatable members. The inner member comprises a shaft 9 mounted in the front and rear heads and extending through the latter for connection with the secondary motor, 3, as hereinafter set forth, and paddles or blades 10 fixed to the shaft 9 and preferably disposed at angles to a plane extending transversely of the freezer to propel the material toward one end of the cylinder. The outer member consists of front and rear spiders, one being shown at 11, having hubs rotatable on the shaft 9, certain aligned arms of the spiders carrying an ejecting device 12 and other aligned arms carrying a pivoted scraper 13. The number of ejecting devices and scrapers may be increased, if desired, particularly where the capacity of the freezer is relatively large. The rear spider 11 is provided with a sleeve shaft 14, which extends through the rear head 5 for connection to the secondary motor 3, as hereinafter set forth.

The primary motor 2 may be of any desired type, that shown comprising an electric motor, the shaft 2a of which is connected to and drives the power generating units of the secondary motor 3. The electric current supply wires and the means for starting and stopping the motor are not shown, but the same may be of any desired construction.

Of the secondary motor, 15, 15a, indicate a pair of power generating units or hydraulic pressure generators and 16, 16a, indicate a pair of hydraulic motors the power generating units 15, 15a, being connected to the motors 16, 16a, respectively, and the latter in turn being connected to and driving the shafts 14, 9, respectively.

Each of the driving units 16, 16a, consists of a pair of fluid operated motors of the rotary piston type connected to one of the shafts 9, 14, and each of the power generating units consists of a pair of pumps of the rotary piston type, for supplying a fluid, such as oil, under pressure to one of the driving units, whereby the latter is driven to rotate the shaft to which it is connected.

The units 15, 15a, 16, 16a, are similar in construction, so that the description of one will apply to each of the others, except that the shaft 2a of the primary motor 2 is connected to all of the pistons of the pairs of pumps constituting the units 15, 15a (see Fig. 2); whereas the pistons of the unit 16 are keyed to and drive the shaft 14 and the pistons of the unit 16a are keyed to and drive the shaft 9, and, also, the discharge pipes leading from each unit 15, 15a, constitute the supply pipes for one of the units 16, 16a.

The units 15, 15a, are preferably mounted in a casing 17 which forms a reservoir for the oil to be pumped thereby to the units 16, 16a. The bases 18 for the units 15, 15a, preferably rest on the bottom 17a of the casing, being arranged side by side so that a single shaft 2x may be connected to their respective pistons. The shaft 2x is preferably connected at its outer end by a flexible coupling 19 to the shaft 2a.

The units 16, 16a, are preferably mounted in a casing 17b, which forms a receiver for the oil discharged from these units. The bases 18a for the units 16, 16a, rest directly upon the bottom of the receiver 17b in side by side relation, whereby the shafts driven thereby are in concentric relation, as shown.

20 indicates the supply pipes for the pumps of the units 15, 15a, the outer ends of the pipes being submerged in the oil in the casing or reservoir 17, whereby the oil is sucked or drawn into the pump casings. As each unit comprises two pumps (see Fig. 2), there are two supply pipes for each unit, and likewise two discharge pipes 21. The discharge pipes 21 for the unit 15 are preferably connected to a single conduit 22, which has branches 23, 23, leading to the inlet side of the driving unit 16; the discharge pipes 21 for the unit 15a are preferably connected to a single conduit 24, which has branches 25, 25, leading to the inlet side of the driving unit 16a. Each unit 16, 16a, is provided with two discharge pipes 26. As the shafts 9 and 14 are driven in opposite directions, the inlets and outlets for one unit are reversed as compared to the other unit. 27 indicates a return conduit leading from the receiver 17b to the reservoir 17, to permit the spent oil to be returned for repumping, whereby a single supply of oil may be used for the generating and driving units.

Each generating unit 15, 15a, consists of (a) end walls 29, 29, an intermediate member 30 and division walls 31, 31a, shaped to form two chambers 32, 32a, upon opposite sides of the division walls and (b) rotary pistons 33, 33a, mounted in said chambers 32, 32a, respectively, and suitably keyed to the shaft 2x, the pistons being arranged in opposite relation with respect to each other for well known reasons. The division walls 31, 31a, are secured together by countersunk screws 34 and their opposing faces are formed with related recesses to accommodate an anti-friction bearing 35, and the outer faces of the end walls 29 are provided with rings 36 forming pockets for anti-friction bearings 37, held in the pockets by nuts 38. These bearings serve to support the shaft 2x. The upper wall of the intermediate member 30 is thickened as shown at 30a and this portion has formed in it the inlet passages connected to the supply pipes 20, the outlet passages 39 connected to the discharge pipes 21 and spaces 40 the walls of which form guides for plates 41. The inner ends of the plates ride on the side walls or peripheries of the pistons 33, 33a, to control the flow of the oil to and from the pumping units 15, 15a, and similar plates 41a control the application of the pressure to the pistons of the driving units 16, 16a. The upper ends of the spaces 40 are connected to the inlet passages 39 by ducts 42, so that the walls thereof will be lubricated and back pressure against the rear ends of the plates 41 when moving outwardly will be eliminated. The duct 42 is also advantageously connected to the inlet passage since the pressure of the fluid holds the valve plate in contact with the piston. Each inlet pipe 20 is threaded into the opening in a cap plate secured to the wall 30a, the opening in the plate registering with the passage in the wall. Each discharge pipe is similarly connected to the outlet passage.

Each driving unit 16, 16a, is similar in construction to each of the pumping or pressure generating units 15, 15a, except that the fluid pressure is applied to the pistons of these units to drive the shaft 9, 14, and accordingly the discharge pipes of the latter units are connected to the inlets for the units 16, 16a, to supply the fluid under pressure to the pistons 43 within the chambers 44 thereof.

The sleeve shaft 14 extends through the outer side wall 29a of the unit 16, the division wall 43 therein and the inner side wall 29a, being (a) mounted in the anti-friction bearings 37a, 37a, 35a, arranged similarly to the bearings 37, 37, 35, respectively, of the units 15, 15a, and (b) keyed to the pistons 43, 43, as shown in Fig. 3, which are oppositely arranged with respect to each other. The shaft 9 extends through the sleeve 14 and also the outer side wall 29b of the unit 16a, the division wall therein and the inner side wall 29b, being mounted in similarly arranged anti-friction bearings and keyed to the pistons of the unit.

45, 46, indicate valves in the conduits 22, 24, respectively, arranged to regulate the flow of the oil therethrough. When either valve is operated to cut-off the supply of pressure to the adjacent unit 16, 16a, the fluid flows through a branch pipe 47 back into the reservoir. 17. When either valve is operated to connect the adjacent conduit to the branch 47, the shaft connected to the unit supplied by such conduit is stopped. By operating both valves, both shafts may be stopped. Accordingly, it will be seen that either shaft may be stopped independently of the other shaft. By adjusting either valve, so that a part of the oil under pressure flows through the conduit to the adjacent unit and the remainder passes into the branch 47, the speed of the adjacent unit 16 or 16a is reduced, the effect of which is to drive the shafts 9, 14, at different speeds.

48 indicates a cock in the return conduit 27 to permit draining of the system.

In Figs. 1, 2, 3 and 4 the driving units 16, 16a, are similar in size to the units 15, 15a, so that the speed of each driving units 16, 16a is equal to its pressure supply unit (with the control valve open), except for leakage losses. By making the power units 15′, 15a′, smaller, as compared to the driving units as shown in Fig. 5, the speed of the shafts connected to the driving units 16′, 16a′, will be less than the speed of the power shaft 2a′ for the power units 15′, 15a′.

In Fig. 6 I have shown an arrangement in which each power generating unit 15x, 15x′, is connected by a conduit 22x to a driving unit 16x corresponding in size to it and a driving unit 16x′ of larger size, the conduit being provided with a valve 46x to supply the pressure to either unit, at will. In this arrangement one pair of driving units 16x, 16x′, is connected to the shaft 9x and the other pair of driving units is connected to the shaft 14x. In this form of construction, I provide for two speeds for each shaft without waste of power of the primary motor 2x′. The speed of the shafts may be reduced by regulating the valves 46x, in which event a portion of fluid is returned to the reservoir without being used.

The construction of driving mechanism herein disclosed permits easy starting at any and all times. As a result, strains on the cylinder walls and agitating mechanism are materially reduced in starting the agitating mechanism, while, due to stoppage of the agitating mechanism during a freezing operation, the refrigeration present has hardened the mixture being frozen.

My construction of freezing apparatus is advantageous, since all gearing, sprockets and drive chains are eliminated, and the number of moving parts is reduced. The driving mechanism is of flexible construction in that the primary motor and the power units 15, 15a, can be disposed in various positions to suit circumstances and need not occupy any predetermined relation to the driving units 16, 16a. The units may be mounted in close relation and also in close relation to the freezer. It will also be noted that each power unit and each driving unit is independent of the remaining units, so that each may be replaced in a ready manner.

Each of the shafts 9, 14, may be made in sections and removably connected together by suitable clutch elements, so that the agitating mechanism may be removed from the cylinder 4.

To those skilled in the art to which my invention relates many changes in construction and widely differing embodiments and applications of my invention will suggest themselves without departing from the spirit and scope of the invention. My disclosures and the description herein are purely illustrative and are not intended to be in any sense limiting.

What I claim is:

1. In a freezing apparatus, the combination of a freezing cylinder having a stationary head at one end and relatively rotatable agitating members therein and connected to a pair of concentric shafts extending through said head, aligned hydraulic motors each consisting of a chamber having an inlet and an outlet, and a rotary piston mounted therein and connected to one of said shafts, a pair of aligned pumps each consisting of a chamber having an inlet and an outlet and a rotary piston mounted therein and a conduit leading from said outlet and connected to the inlet for one of said motors, a driven shaft connected to the pistons for said pumps, and means for regulating the flow of the fluid through each of said conduits independently.

2. In a freezing apparatus, the combination of a freezing cylinder having therein independently rotatable agitating members, a pair of concentrically arranged shafts to which said members are respectively connected, aligned pairs of hydraulic motors connected to said shafts, respectively, each pair of motors having different capacities, means for supplying fluid under pressure including a conduit for each pair of motors having branches connected thereto, a valve for alternately connecting each conduit to either of its branches, a pair of aligned pumps each connected to one of said conduits and supplying fluid thereto and a driven shaft for driving said pumps, and a valve in each conduit.

In testimony whereof, I have hereunto subscribed my name.

CLIFFORD MORROW.